US 6,570,751 B2

(12) United States Patent
Iwamoto et al.

(10) Patent No.: US 6,570,751 B2
(45) Date of Patent: May 27, 2003

(54) MAGNETIC ENCODER, WHEEL BEARING AND METHOD OF MANUFACTURING MAGNETIC ENCODER

(75) Inventors: Kenichi Iwamoto, Iwata (JP); Takashi Koike, Iwata (JP); Kazuyuki Inokuchi, Iwata (JP)

(73) Assignee: NTN Corporation, Osaka (JP)

( * ) Notice: Subject to any disclaimer, the term of this patent is extended or adjusted under 35 U.S.C. 154(b) by 67 days.

(21) Appl. No.: 09/785,468

(22) Filed: Feb. 20, 2001

(65) Prior Publication Data
US 2001/0030533 A1 Oct. 18, 2001

(30) Foreign Application Priority Data

Mar. 1, 2000  (JP) ........................... 2000-055798

(51) Int. Cl.$^7$ .................. G01P 3/487; F16C 19/00; H01F 7/02; H01F 41/02
(52) U.S. Cl. ............. 361/143; 324/174; 324/207.22; 335/306; 384/448; 29/593
(58) Field of Search ................ 324/206, 207.2, 324/207.21, 207.22, 207.25, 173, 174, 228; 384/448; 341/15; 361/143, 146, 147; 335/302, 306; 29/593, 607–609; 148/101, 103, 108; 264/427, DIG. 58

(56) References Cited

U.S. PATENT DOCUMENTS

| 2,496,103 A | * | 1/1950  | Neufeld ............... 324/206 X |
| 3,293,636 A | * | 12/1966 | Dunne ................. 324/174 X |
| 5,089,817 A | * | 2/1992  | Santos et al. ............ 341/15 |
| 5,117,183 A | * | 5/1992  | Santos ................... 324/228 |
| 5,545,985 A | * | 8/1996  | Campbell ............ 324/207.21 |
| 6,329,814 B1 | * | 12/2001 | Ichiman et al. ....... 324/207.22 |

FOREIGN PATENT DOCUMENTS

| JP | 5-238369 | 9/1993 |
| JP | 6-281018 | 10/1994 |

* cited by examiner

Primary Examiner—Gerard R. Strecker
(74) Attorney, Agent, or Firm—McDermott, Will & Emery

(57) ABSTRACT

A magnetization yoke having an exciting coil wound thereon is arranged to hold a magnetic member and a metal ring so that a magnetic flux passes through and magnetizes the magnetic member in the portion held by the magnetization yoke for successively magnetizing the magnetic member along the circumferential direction thereby multipolarly magnetizing the magnetic member in the circumferential direction. Thus, a magnetic encoder having large magnetization strength and a small magnetization pitch error, a wheel bearing employing the same and a method of manufacturing a magnetic encoder can be obtained.

4 Claims, 12 Drawing Sheets

$P_1 = P_2$ $P_1 \neq P_2$

MAGNETIC ENCODER, WHEEL BEARING AND METHOD OF MANUFACTURING MAGNETIC ENCODER

BACKGROUND OF THE INVENTION

1. Field of the Invention

The present invention relates to a magnetic encoder applied to a bearing having a function of detecting a rotational frequency or the direction of rotation, a wheel bearing having the magnetic encoder and a method of manufacturing a magnetic encoder.

2. Description of the Background Art

A magnetic encoder for detecting a rotational frequency or the like has such a structure that a magnetic member is circumferentially formed on an annular member and multipolarly magnetized in the circumferential direction. The magnetic encoder is rotated with a rotator so that a magnetic sensor closely opposed to the magnetic member detects the rotation thereby detecting the rotational frequency.

In general, the magnetic member of such a magnetic encoder is magnetized by one-shot magnetization or index magnetization.

FIG. 17 is a diagram for illustrating a method of performing one-shot magnetization on a magnetic member of a magnetic encoder. Referring to FIG. 17, a magnetic encoder 103 consisting of a metal ring 102 forming an annular member and a magnetic member 101 provided on the outer peripheral surface of the metal ring 102 is prepared. A magnetization yoke 111 supporting a plurality of exciting coils 112 is so arranged that the exciting coils 112 are opposed to the surface of the magnetic member 101 of the magnetic encoder 103. In this state, a current is fed to the exciting coils 112 in a prescribed direction, thereby magnetizing the magnetic member 101 and multipolarly magnetized in the circumferential direction.

FIG. 18 is a diagram for illustrating a method of performing index magnetization on a magnetic member of a magnetic encoder. Referring to FIG. 18, a magnetic encoder 203 consisting of a metal ring 202 forming an annular member and a magnetic member 201 provided on the outer peripheral surface of the metal ring 202 is prepared. A pair of tooth profiles of a magnetization yoke 211 having an exciting coil 212 wound thereon are closely arranged on the outer peripheral surface of the magnetic encoder 203. In this state, a current is fed to the exciting coil 212 for generating a magnetic flux passing through the magnetization yoke 211 in a prescribed direction, and the magnetic flux passing through the clearance between the tooth profiles magnetizes the magnetic member 201 for obtaining a pair of N and S poles. Thereafter a step of rotating the magnetic encoder 203 by a prescribed angle and magnetizing the same is repeated thereby multipolarly magnetizing the overall periphery of the magnetic member 201 in the circumferential direction. This method is hereinafter referred to as surface layer magnetization.

In the one-shot magnetization shown in FIG. 17, however, the magnetization pitch is disadvantageously largely irregularized depending on the manufacturing accuracy for each magnetic pole or the way of winding the coil when the pitch is reduced to not more than a pole width of about 1.5 mm, although high magnetization strength is attained.

In the surface layer magnetization shown in FIG. 18, the magnetization yoke 211 has a pair of tooth profiles and hence magnetization pitch accuracy is improved when attaining indexing accuracy of a spindle for rotating a workpiece. In this method, however, only the surface layer of the magnetic member 201 can be magnetized, disadvantageously leading to small magnetization strength.

SUMMARY OF THE INVENTION

An object of the present invention is to provide a magnetic encoder having high magnetization strength similar to that in one-shot magnetization and a small magnetization pitch error similar to that in surface layer magnetization.

Another object of the present invention is to provide a wheel bearing having a magnetic encoder having high magnetization strength and a small magnetization pitch error.

A magnetic encoder according to the present invention comprises an annular member and a magnetic member circumferentially provided on the annular member and multipolarly magnetized in the circumferential direction, and is characterized in that a magnetization pitch error of the magnetic member is not more than 3% and surface magnetization strength per unit magnetic pole is at least 30 mT/mm.

Then, surface magnetization strength per unit magnetic pole is a value obtained by dividing a maximum surface magnetization strength in one magnetic pole by the magnetic pole width.

Thus, it is possible to obtain a magnetic encoder having a small magnetization pitch error of not more than 3% similarly to that obtained in surface magnetization and high surface magnetization strength of at least 30 mT/mm similarly to that obtained in one-shot magnetization. Thus, the magnetic encoder can detect a rotational frequency or the like with higher accuracy.

In the aforementioned magnetic encoder, the annular member preferably consists of a magnetic substance, and the magnetic member preferably consists of an elastomer mixed with magnetic powder.

The annular member consists of a magnetic substance as described above, so that leakage of a magnetic flux can be suppressed in magnetization of the magnetic member and magnetization strength of the magnetic member is improved.

A wheel bearing according to the present invention rotatably supporting a wheel has a rotating member provided with the aforementioned magnetic encoder, and is characterized in that the rotating member is so arranged that the magnetic encoder is closely opposed to a magnetic sensor for detecting the speed of rotation of the wheel.

Thus, a wheel bearing provided with a magnetic encoder capable of rotating the speed of rotation of a wheel in high accuracy can be obtained.

The aforementioned wheel bearing preferably has a fixed member rotatably supporting the rotating member, and the magnetic encoder preferably forms a sealing apparatus sealing an annular space between the rotating member and the fixed member.

Thus, the magnetic encoder can also serve as the sealing apparatus, whereby increase of the number of components can be prevented.

In the aforementioned wheel bearing, the sealing apparatus preferably has a sealing member mounted on the fixed member to be capable of coming into sliding contact with the annular member of the magnetic encoder.

Thus, it is possible to prevent leakage of oil from the bearing or penetration of foreign matter of moisture from outside the bearing.

A method of manufacturing a magnetic encoder according to the present invention, circumferentially providing a magnetic member on an annular member and magnetizing the magnetic member, arranges a magnetization yoke passing a magnetic flux for magnetizing the magnetic member to hold the magnetic member and the annular member so that the magnetic flux passes through and magnetizes the magnetic member in the portion held by the magnetization yoke for successively magnetizing the magnetic member along the circumferential direction thereby multipolarly magnetizing the magnetic member in the circumferential direction.

The magnetization yoke thus holds the magnetic member and magnetizes the same so that the magnetic flux passes through the magnetic member, whereby magnetization strength can be increased similarly to that obtained by one-shot magnetization. Further, the magnetic member is magnetized every magnetic pole, whereby a magnetization pitch error can be reduced similarly to that obtained in surface layer magnetization so far as indexing accuracy of a spindle can be attained.

Preferably, the aforementioned method of manufacturing a magnetic encoder makes magnetization conditions variable in N pole magnetization and S pole magnetization of the peripheral surface of the magnetic member 1.

Thus, N and S poles can be controlled to reach substantially identical magnetization strength by varying the magnetization conditions.

Preferably, the aforementioned method of manufacturing a magnetic encoder varies the value of a current fed to a coil wound on the magnetization yoke with the N pole magnetization and the S pole magnetization.

Thus, the magnetization strength can be controlled with the value of the current.

Preferably, the aforementioned method of manufacturing a magnetic encoder varies the number of turns of a coil wound on the magnetization yoke with the N pole magnetization and the S pole magnetization.

Thus, the magnetization strength can be controlled with the number of turns of the coil.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

Figure 1:
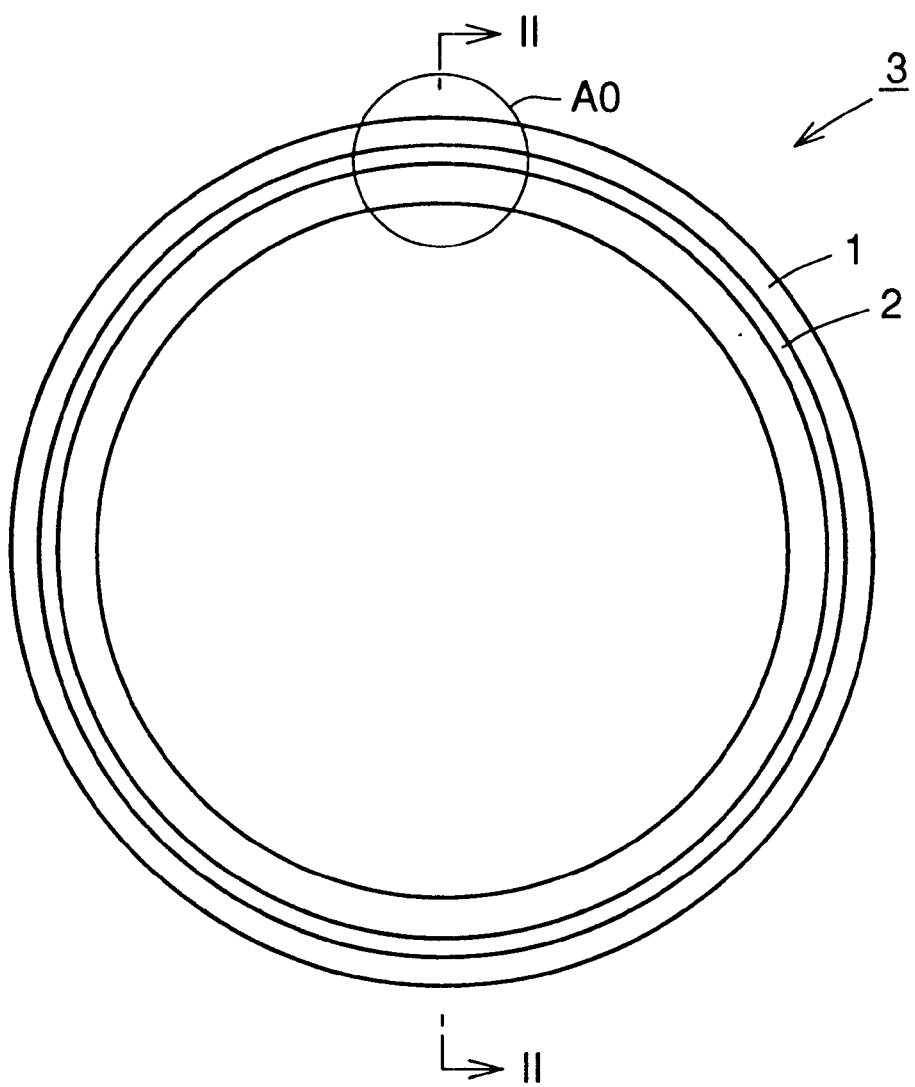
FIG. 1 is a plan view schematically showing the structure of a magnetic encoder according to an embodiment of the present invention.
Figure 2:
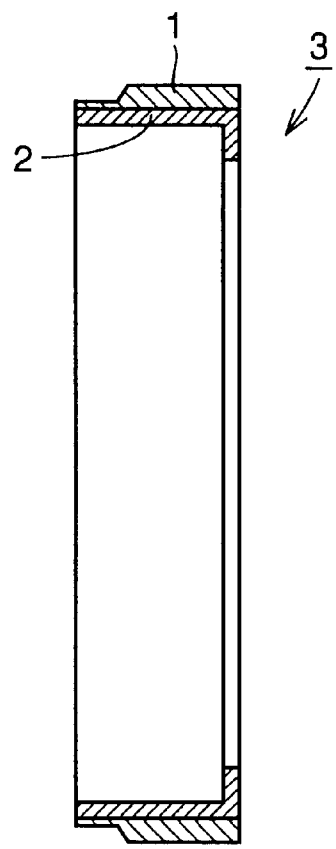
FIG. 2 is a schematic sectional view taken along the line II—II in FIG. 1

Mainly referring to FIGS. 1 and 2, a magnetic encoder 3 according to this embodiment has a magnetic member 1 and a metal ring 2 forming an annular member. The magnetic member 1, circumferentially arranged on the metal ring 2, is arranged on the outer peripheral surface of the metal ring 2 according to this embodiment.

Figure 3:
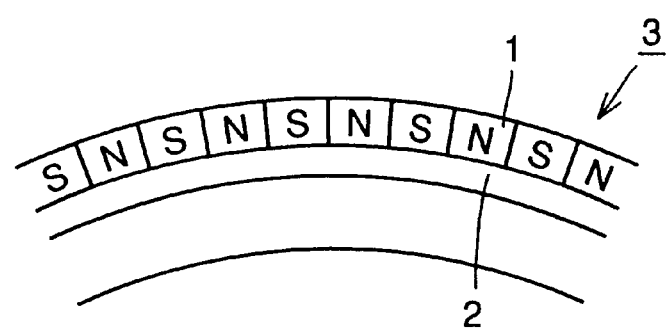
FIG. 3 is a partial plan view showing an area A0 in FIG. 1 in an enlarged manner.

Mainly referring to FIG. 3, the magnetic member 1 has the so-called multipolarly magnetized structure in which N and S poles are alternately magnetized in the circumferential direction.

This magnetic member 1 has a magnetization pitch error of not more than 3% and surface magnetization strength of at least 30 mT/mm per unit magnetic pole.

The magnetization pitch error is given by the following equation:

$$\text{magnetization pitch error} = \frac{1}{\overline{P}}\sqrt{\frac{\sum_{i}^{n}(Pi - \overline{P})^2}{(n-1)}} \times 100\,(\%)$$

where n represents the number of magnetic poles (an N pole and an

S pole form a single magnetic pole),

Pi represents each magnetization pitch and $\overline{P}$ represents an average magnetization pitch.

The magnetization pitch error is obtained from magnetization strength distribution measured with a Hall sensor, for example. When measuring the magnetization strength of the magnetic member 1 shown in FIG. 1 with a Hall sensor, plus and minus rectangular digital signals are obtained with reference to a certain constant magnetization level as shown in FIG. 4B with respect to surface magnetization strength distribution having a waveform shown in FIG. 4A, for example. In the digital signals, each pair of N and S poles are regarded as a single magnetic pole for obtaining the number n of magnetic poles, pitches $P_1, P_2, \ldots, P_n$ of the respective poles and an average magnetization pitch and calculating the magnetization pitch error on the basis of the above equation.

Figure 4A:
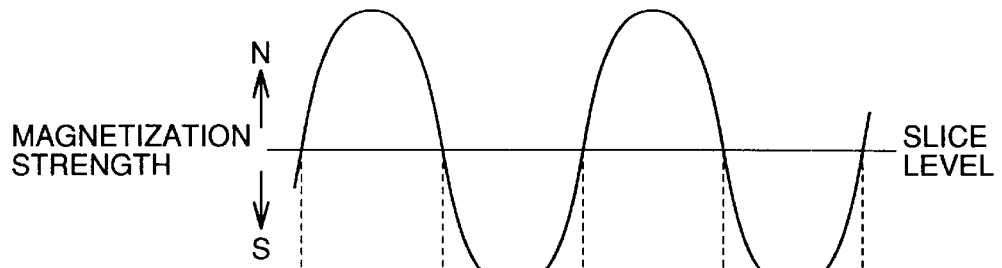
FIGS. 4A and 4B are diagrams for illustrating magnetization strength distribution with reference to a uniform magnetization pitch.
Figure 4B:
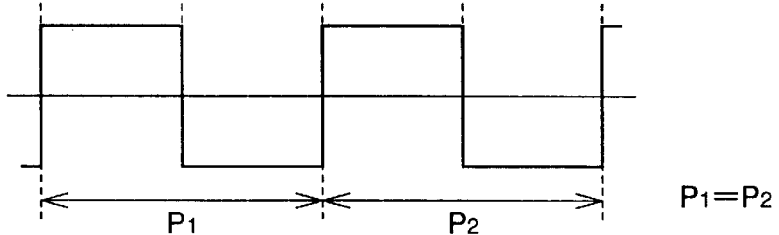
Figure 5A:
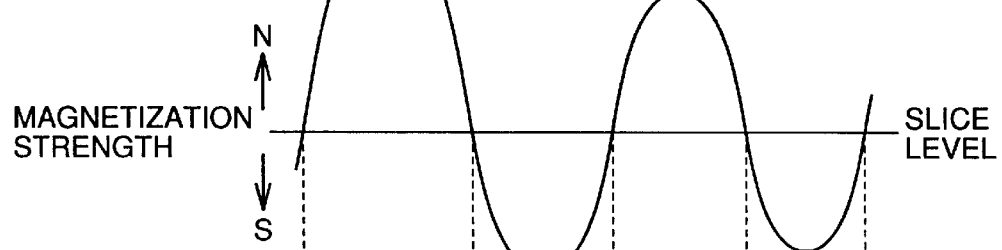
FIGS. 5A and 5B are diagrams for illustrating magnetization strength distribution with reference to a non-uniform magnetization pitch.
Figure 5B:
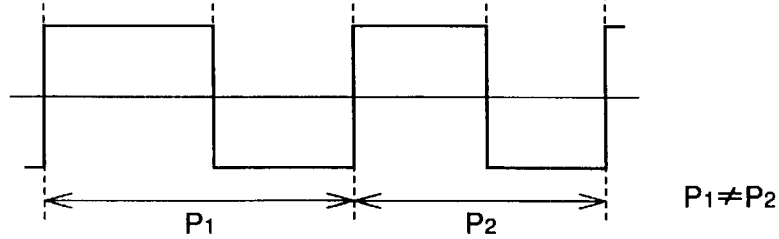

When the magnetic poles are magnetized at regular pitches ($P_1=P_2=\ldots=P_n$) on the circumference of the magnetic member 1 shown in FIG. 1 as shown in FIGS. 4A and 4B, the magnetization pitch error is zero. However, the magnetization strength is dispersed in practice as shown in FIGS. 5A and 5B, and hence it follows that the magnetization pitches are dispersed to result in a magnetic pitch error.

The surface magnetization strength on the surface (the outer peripheral surface) of the magnetic member 1 shown in FIG. 1 is magnetic flux density with a sensor air gap of substantially 0 mm. This surface magnetization strength is measured in a state approaching a gauss meter to the surface of the magnetic member 1, for example. The gauss meter employing a Hall device as a sensor obtains an analog electric signal proportionate to the magnetization strength, converts the output and displays the magnetization strength (magnetic flux density).

Then, surface magnetization strength per unit magnetic pole is a value obtained by dividing a maximum surface magnetization strength in one magnetic pole by the magnetic pole width.

A method of manufacturing the magnetic encoder 3 according to this embodiment is now described.

Figure 6A:
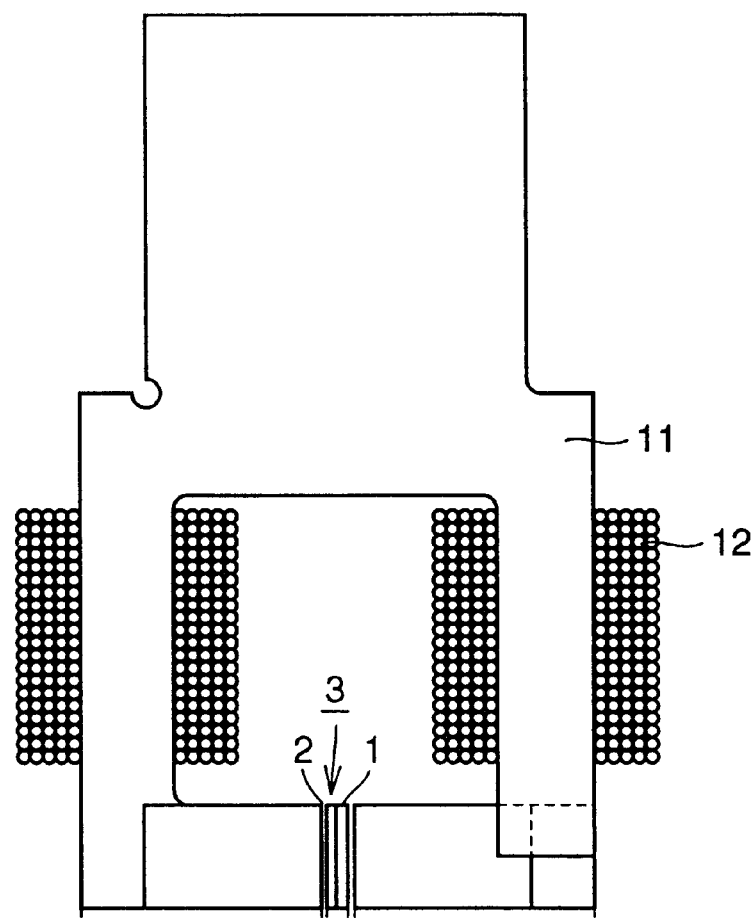
FIGS. 6A and 6B are a front elevational view an a side elevational view showing a magnetization step in a method of manufacturing the magnetic encoder according to the embodiment of the present invention.
Figure 6B:
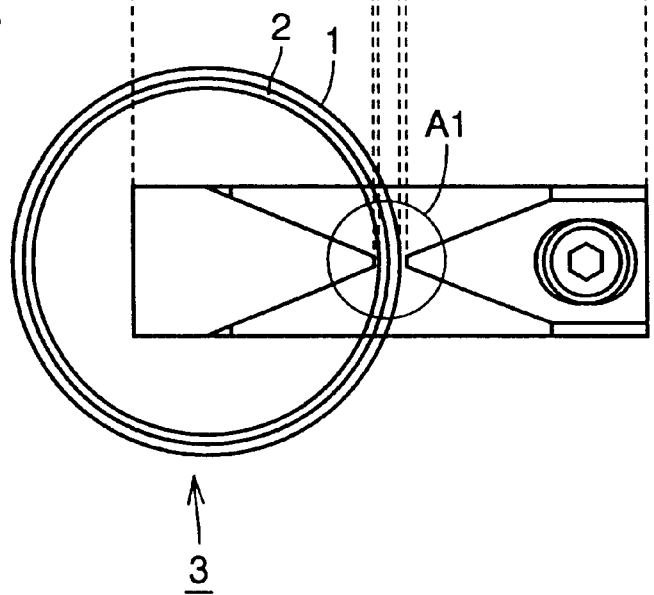
Figure 7:
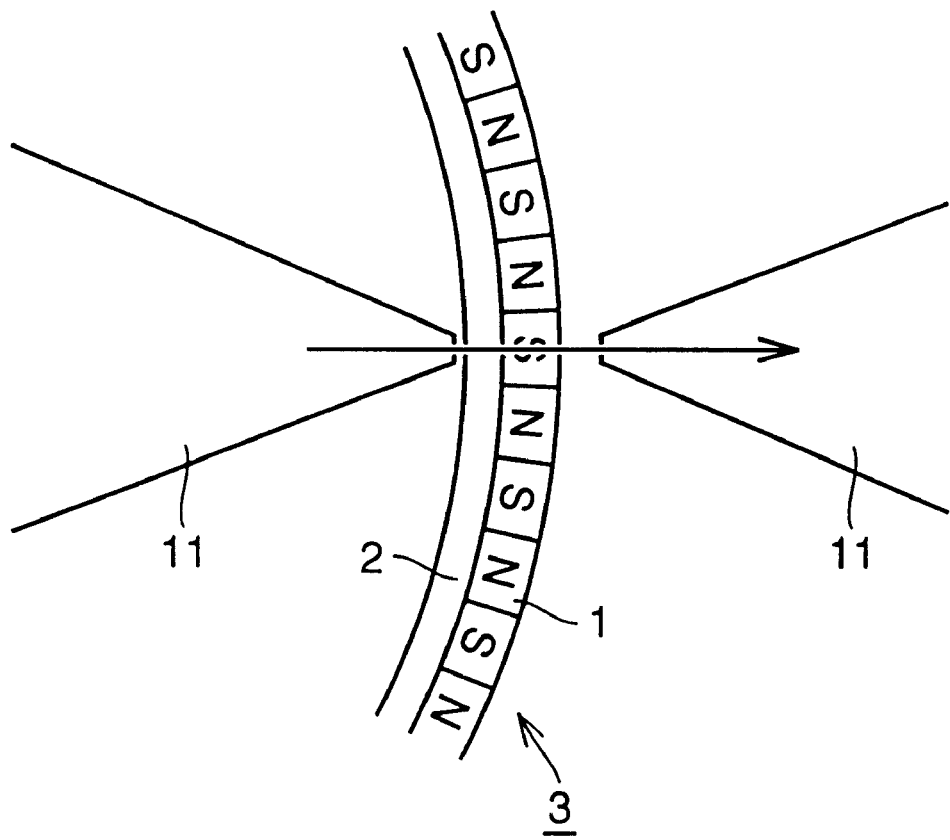
FIG. 7 illustrates an area A1 in FIG. 6B in an enlarged manner.

Referring to FIGS. 6A, 6B and 7, a magnetization yoke 11 having exciting coils 12 wound thereon is fixed to hold the magnetic encoder 3 from the inner peripheral side and the outer peripheral side thereof, i.e., to hold both of the magnetic member 1 and the metal ring 2. The magnetic encoder 3 is mounted on a spindle (not shown) exhibiting small rotational run-out and having excellent indexing accuracy, and so set that outer diameter run-out of the magnetized surface is minimized.

The magnetic encoder 3 is rotated at a speed of several 10 rpm in this state while a pulse-shaped current is fed to the exciting coils 12 in synchronization with angular displacement for magnetizing the magnetic encoder 3 at least once. Thus, the magnetic encoder 3 having the multipolarly magnetized magnetic member 1 can be manufactured.

In this magnetization, a magnetic flux passes through the magnetic member 1 as shown by arrow in FIG. 7, and hence magnetization strength of the magnetic member 1 can be increased. When the magnetic encoder 3 is set on a spindle of indexing accuracy having radial run-out of several $\mu$m and a number of division at least 1000 times the number of magnetic poles, it is obvious that the magnetization pitch error is about ±0.1%, i.e., not more than 3%.

Figure 8:
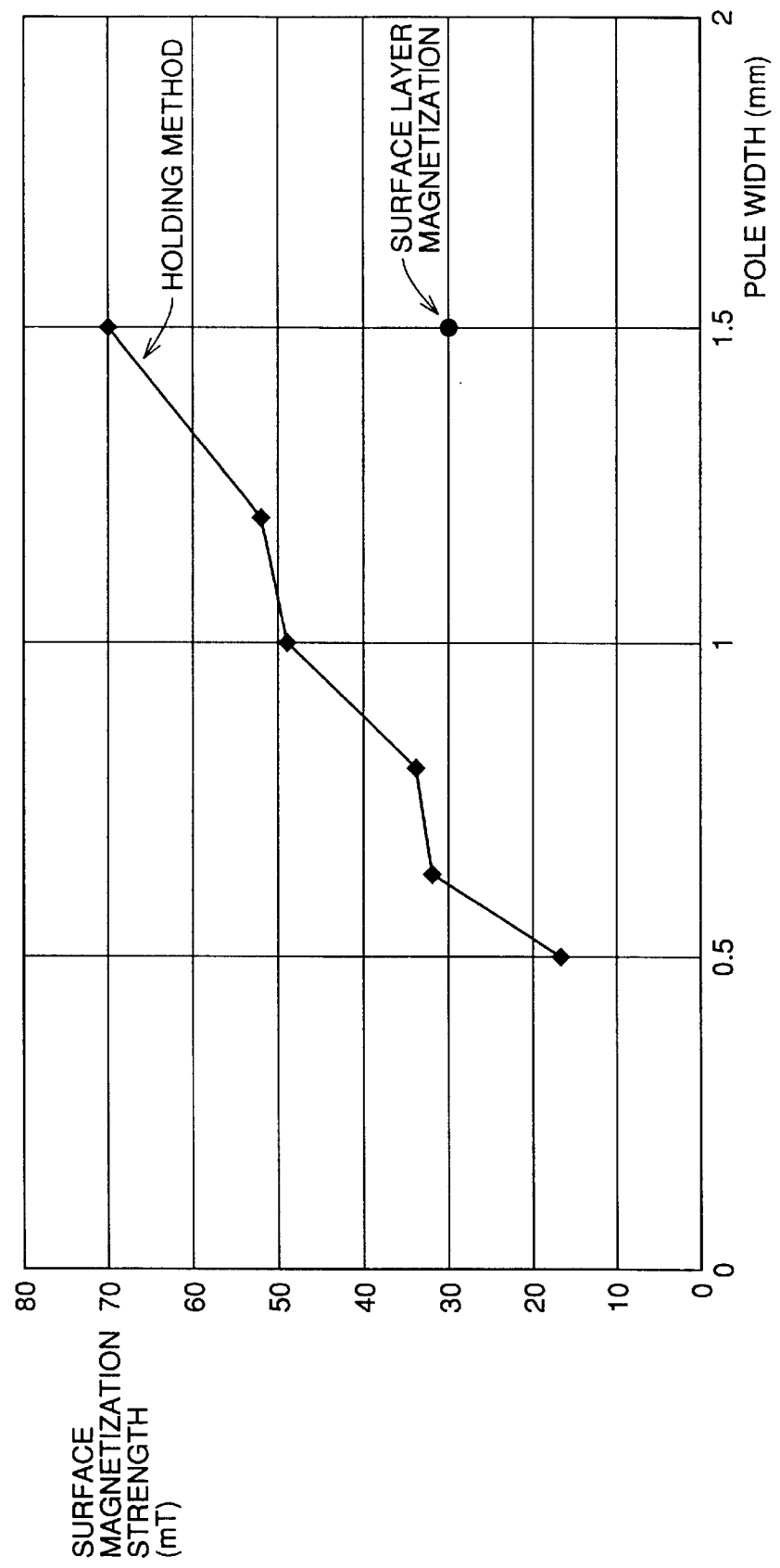
FIG. 8 illustrates the relation between surface magnetization strength and pole widths in the magnetic encoder according to the embodiment.

FIG. 8 shows the relation between pole widths and the surface magnetization strength of the magnetic encoder 3 manufactured by the aforementioned method. It is understood from FIG. 8 that the surface magnetization strength of the magnetic encoder 3 obtained by the aforementioned method is higher than that in the surface magnetization shown in FIG. 18 and that surface magnetization strength of at least 30 mT/mm can be attained in terms of each pole width.

Figure 17:
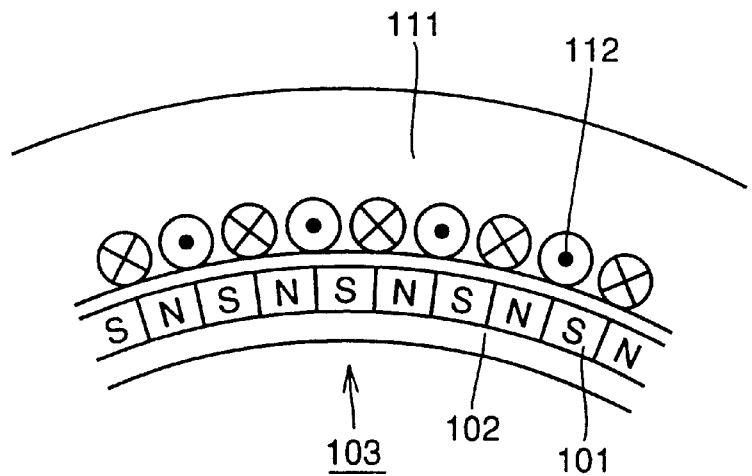
FIG. 17 is a diagram for illustrating one-shot magnetization in a conventional method of manufacturing a magnetic encoder.
Figure 18:
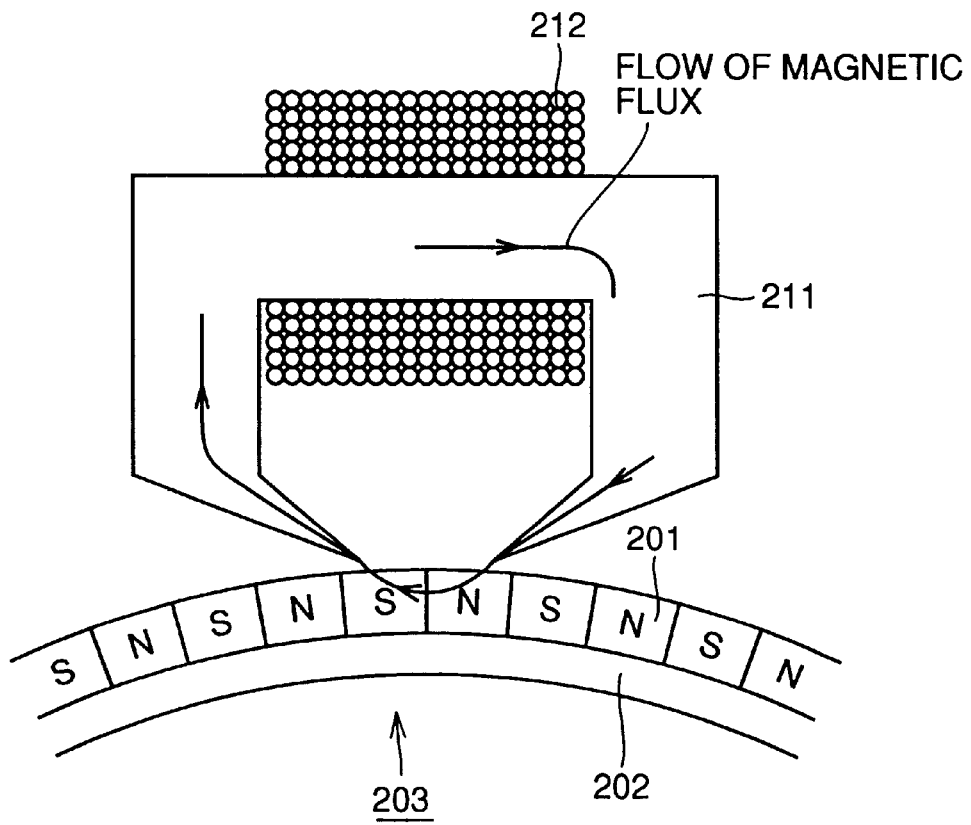
FIG. 18 is a diagram for illustrating surface layer magnetization in another conventional method of manufacturing a magnetic encoder.

Table 1 shows results obtained by measuring magnetization pitch errors and magnetization strength values of the magnetic encoder 3 manufactured by the aforementioned method, the magnetic encoder 103 manufactured by the one-shot magnetization shown in FIG. 17 and the magnetic encoder 203 manufactured by the surface layer magnetization shown in FIG. 18.

In each of the magnetic encoders 3, 103 and 203, the outer diameter of the magnetized surface is $\phi$30 mm, the number of magnetized poles is 32 pairs (pole width: 1.5 mm), the magnetic member 1 is prepared from a rubber magnet, the metal ring 2 is prepared from a magnetic material, and a measured air gap is substantially zero.

The condition that air gap is almost zero means that measurement is performed with the tip of gauss meter probe being in contact with magnetic member 1 and that a distance from the hall element in gauss meter probe to magnetic member 1 is about 0.21 mm.

TABLE 1

Comparison of Magnetization

| Magnetization Method | | Magnetization Pitch Error | Magnetization Strength | |
|---|---|---|---|---|
| | | | N Pole | S Pole |
| One-Shot Magnetization | | ±3.5% | 77 mT | 49 mT |
| Index Magnetization | Surface Layer Magnetization | ±1.0 | 35 mT | 35 mT |
| | Holding Method | ±1.0 | 77 mT | 70 mT |

It is understood from Table 1 that the magnetic encoder 3 obtained by the method (holding method) according to this embodiment has magnetization strength similar to that of the magnetic encoder 103 obtained by one-shot magnetization and a magnetization pitch error similar to that of the magnetic encoder 203 obtained by surface layer magnetization.

The material for the magnetized magnetic member 1 may be a rubber magnet or a plastic magnet. The material for the metal ring 2 is preferably prepared from a magnetic material. When the metal ring 2 consists of a magnetic material, the number of apparent gaps in magnetization is reduced and the magnetization strength can be increased. A magnetic material (iron, for example) exhibits high permeability of at least 1000 with reference to permeability of a non-magnetic material or air. When the metal ring 2 is prepared from a magnetic material, therefore, a magnetic flux resulting from magnetization passes through the magnetic member 1 without suffering a loss through the metal ring 2 so that the magnetization strength of the magnetic member 1 can be increased.

In the surface layer magnetization shown in FIG. 18, N and S poles are simultaneously formed and exhibit substantially identical magnetization strength. In the method according to this embodiment, however, the N and S poles may not necessarily have the same strength. In this case, the N and S poles can conceivably be set to substantially identical magnetization strength by controlling a magnetization condition (the value of the current fed to the exciting coils 12 or the number of turns of the exciting coils 12) for magnetizing the N and S poles.

The structure of the magnetization yoke 11 according to this embodiment is simpler than that of the magnetization yoke 111 in the one-shot magnetization shown in FIG. 17. As to the magnetization yoke 111 in the one-shot magnetization shown in FIG. 17, molds must be manufactured at regular pitches by the number of magnetic poles for arranging the exciting coils 112, and the cost for reducing the magnetization pitch error is increased. On the other hand, the magnetization yoke 11 according to this embodiment requires no such high manufacturing accuracy and hence the initial cost (the cost for manufacturing the magnetization yoke 11) is advantageously reduced.

In the magnetization method according to this embodiment, a magnetic encoder having an arbitrary magnetization width can be manufactured by varying magnetization timing in a software manner while leaving the magnetization yoke 11 intact. When inputting the number of magnetic poles in a magnetization apparatus employed in this embodiment, a pulse-shaped magnetization current corresponding to the number of the magnetic poles flows to the exciting coils 12 during single rotation, thereby deciding synchronization of the magnetization current from the rotational frequency and the number of the magnetic poles of the magnetic encoder 3.

Various structures of wheel bearings to which the magnetic encoder 3 according to this embodiment is applied are now described.

Figure 9:
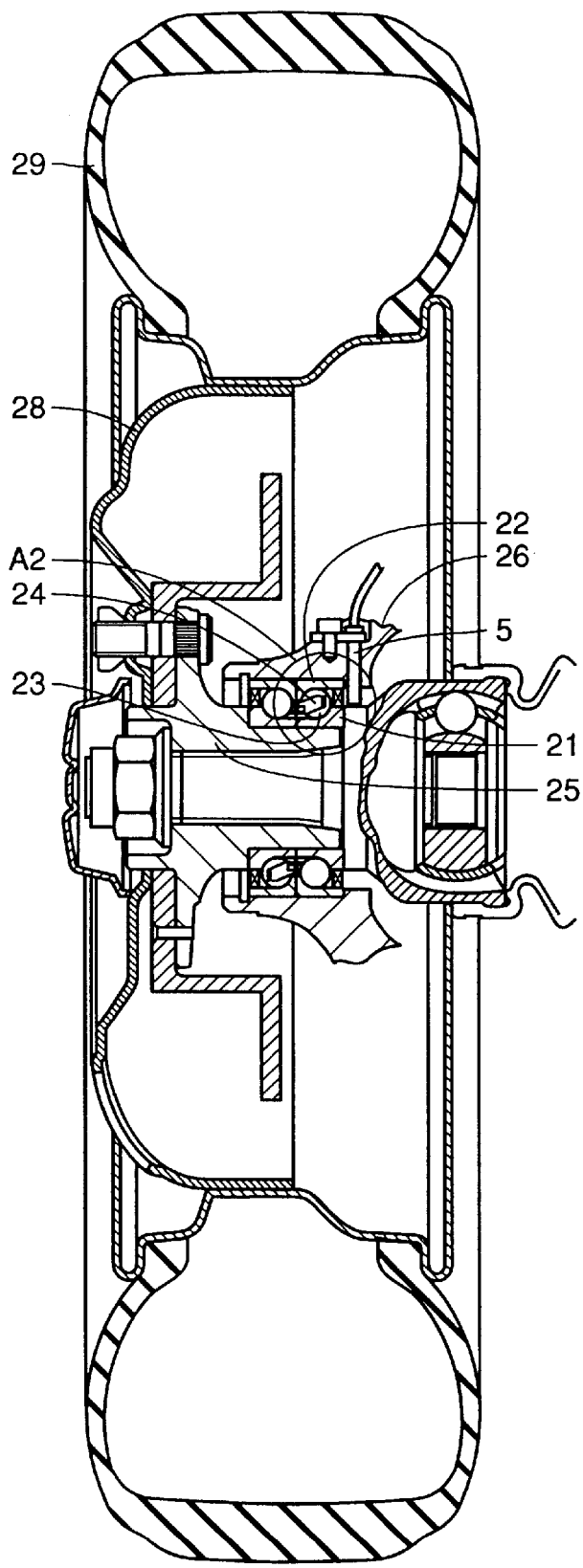
FIG. 9 is a schematic sectional view showing a first example of the magnetic encoder according to the embodiment of the present invention applied to a wheel bearing.
Figure 10:
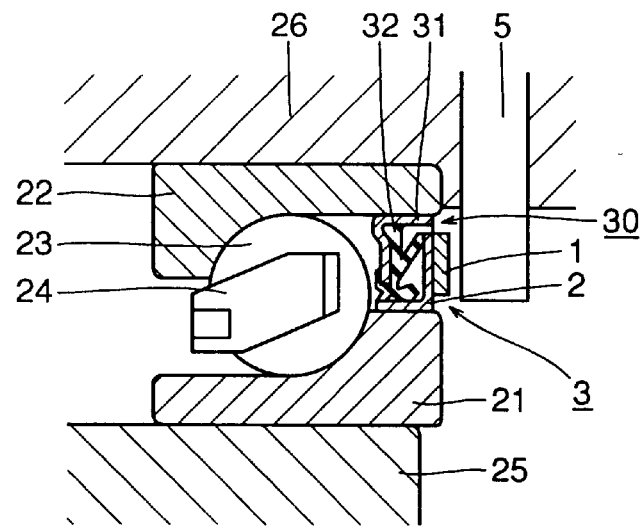
FIG. 10 is a partial sectional view showing an area A2 in FIG. 9 in an enlarged manner.

A wheel bearing shown in FIGS. 9 and 10 rotatably supports a rotating-side member such as a hub ring 25 supporting a wheel (driving wheel) consisting of a wheel 28 and a tire 29 with respect to a fixed-side member such as a knuckle 26. This wheel bearing mainly has an inner ring 21, an outer ring 22, a rolling element 23, a holder 24 and a sealing apparatus 30 including the magnetic encoder 3. The inner ring 21 is engaged with the outer peripheral surface of the hub ring 25, and the outer ring 22 is engaged with the inner peripheral surface of the knuckle 26. The rolling element 23 is held by the holder 24 to be capable of rolling between the inner ring 21 and the outer ring 22.

The magnetic encoder 3 is press-fitted with an outer diametral portion of an end of the inner ring 21, while the magnetic member 1 multipolarly magnetized in the circumferential direction is closely opposed to a magnetic sensor 5 fixed to the knuckle 26.

A fixed disk 31 is press-fitted with an inner diametral portion of the outer ring 22, and a sealing member 32 mounted on the fixed disk 31 is arranged to be capable of coming into sliding contact with the annular member 2. Thus, the magnetic encoder 3, the fixed disk 31 and the sealing member 32 form the sealing apparatus 30, and the magnetic encoder 3 also serves as a sealing slinger. The sealing apparatus 30 can prevent leakage of oil from the wheel bearing or penetration of foreign matter or moisture from outside the bearing.

Figure 11:
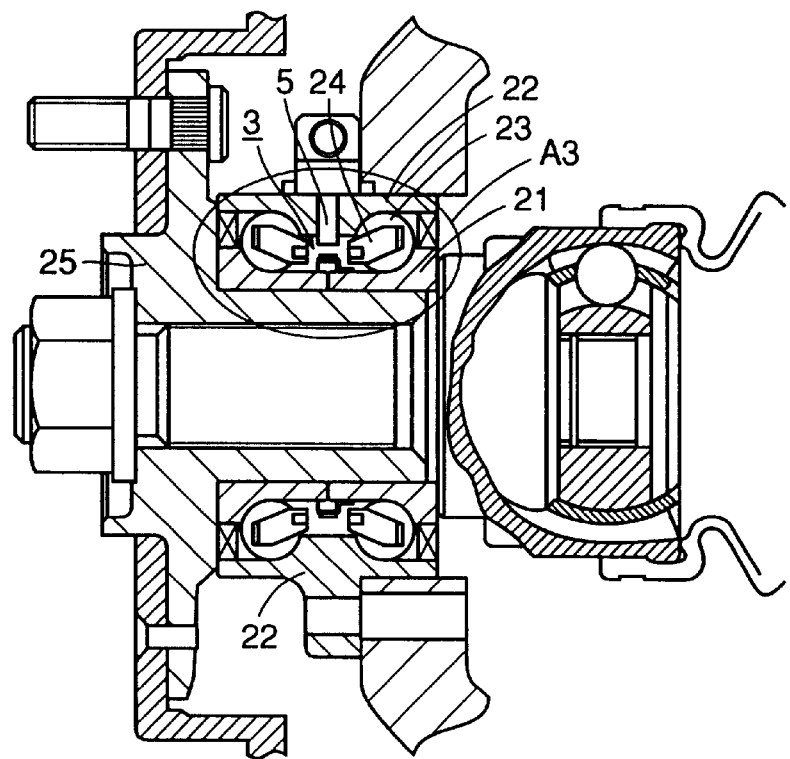
FIG. 11 is a schematic sectional view showing a second example of the magnetic encoder according to the embodiment of the present invention applied to a wheel bearing.
Figure 12:
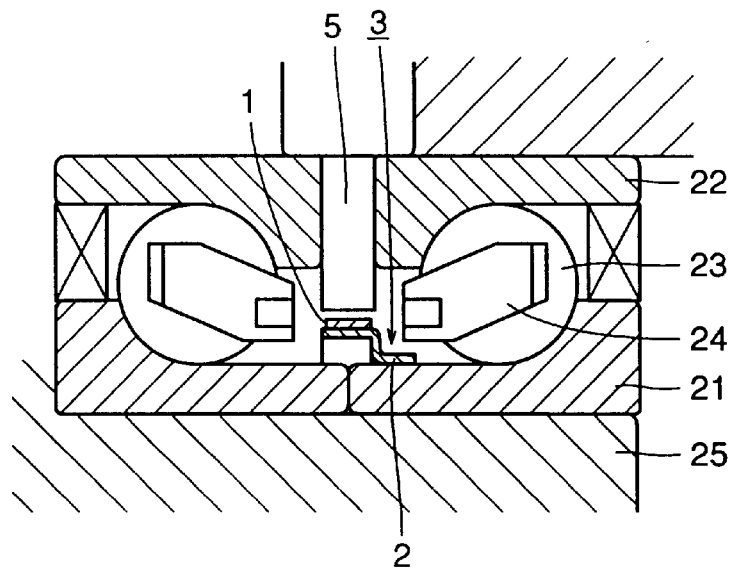
FIG. 12 is a partial sectional view showing an area A3 in FIG. 11 in an enlarged manner.

A wheel bearing shown in FIGS. 11 and 12, rotatably supporting a wheel (driving wheel) similarly to that shown in FIGS. 9 and 10, mainly has an inner ring 21, an outer ring 22, a rolling element 23, a holder 24 and the magnetic encoder 3. In particular, the magnetic encoder 3 is press-fitted in an outer diametral portion of the inner ring 21 to be located between two bearings. A magnetic sensor 5 is arranged between the two bearings to be closely opposed to the magnetic member 1 of the magnetic encoder 3.

The remaining structure of this wheel bearing is substantially identical to that shown in FIGS. 9 and 10, and hence members identical to those of the wheel bearing shown in FIGS. 9 and 10 are denoted by the same reference numerals, and redundant description is not repeated.

Figure 13:
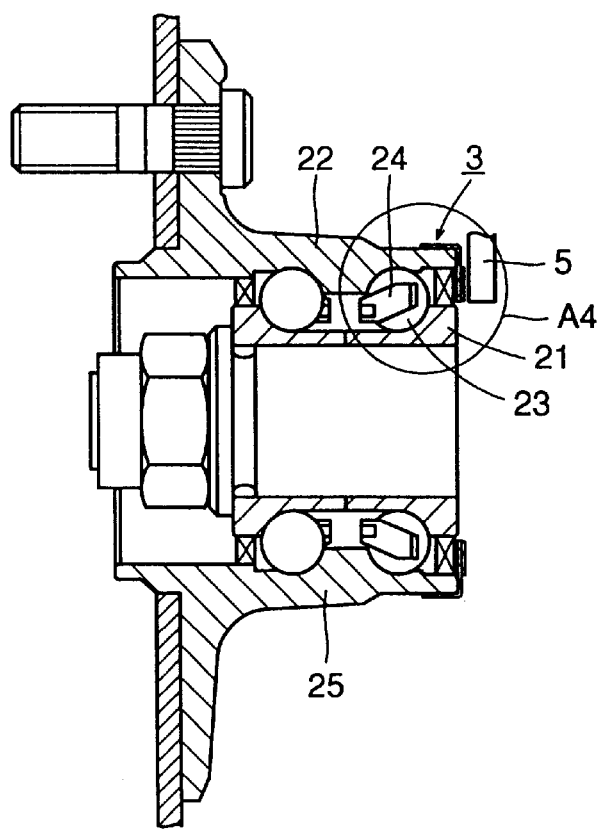
FIG. 13 is a schematic sectional view showing a third example of the magnetic encoder according to the embodiment of the present invention applied to a wheel bearing.
Figure 14:
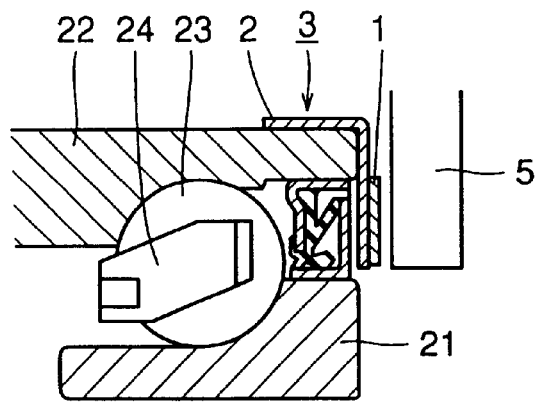
FIG. 14 is a partial sectional view showing an area A4 in FIG. 13 in an enlarged manner.

A wheel bearing shown in FIGS. 13 and 14, rotatably supporting a wheel (coupled driving wheel), mainly has an inner ring 21, an outer ring 22 integrated with a hub ring 25, a rolling element 23, a holder 24 and the magnetic encoder 3. In particular, the magnetic encoder 3 is press-fitted with the outer periphery of the hub ring 25. A magnetic sensor 5 is mounted on a fixed-side member to be closely opposed to the magnetic member 1 of the magnetic encoder 3. In this wheel bearing, the outer ring 22 is on the side of a rotating member and the inner ring 21 is on the side of a fixed member.

Figure 15:
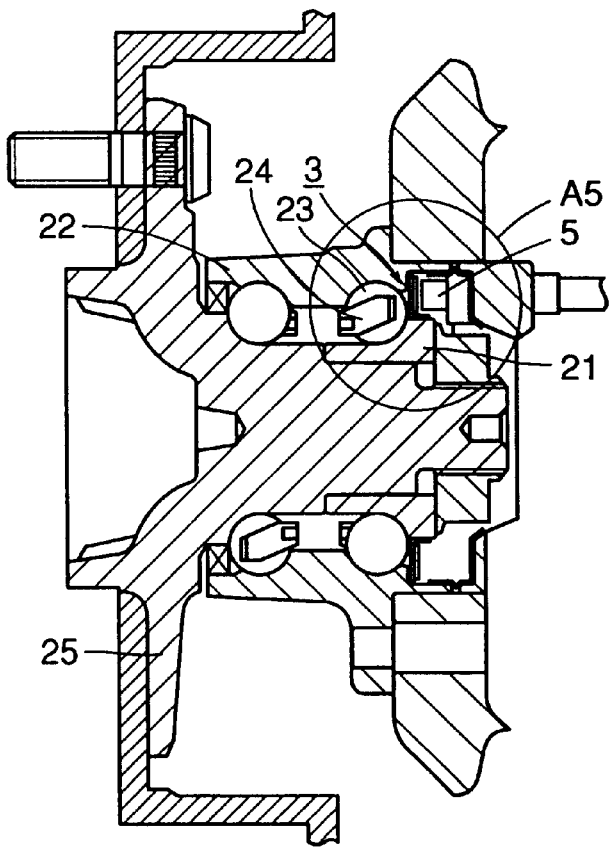
FIG. 15 is a schematic sectional view showing a fourth example of the magnetic encoder according to the embodiment of the present invention applied to a wheel bearing.
Figure 16:
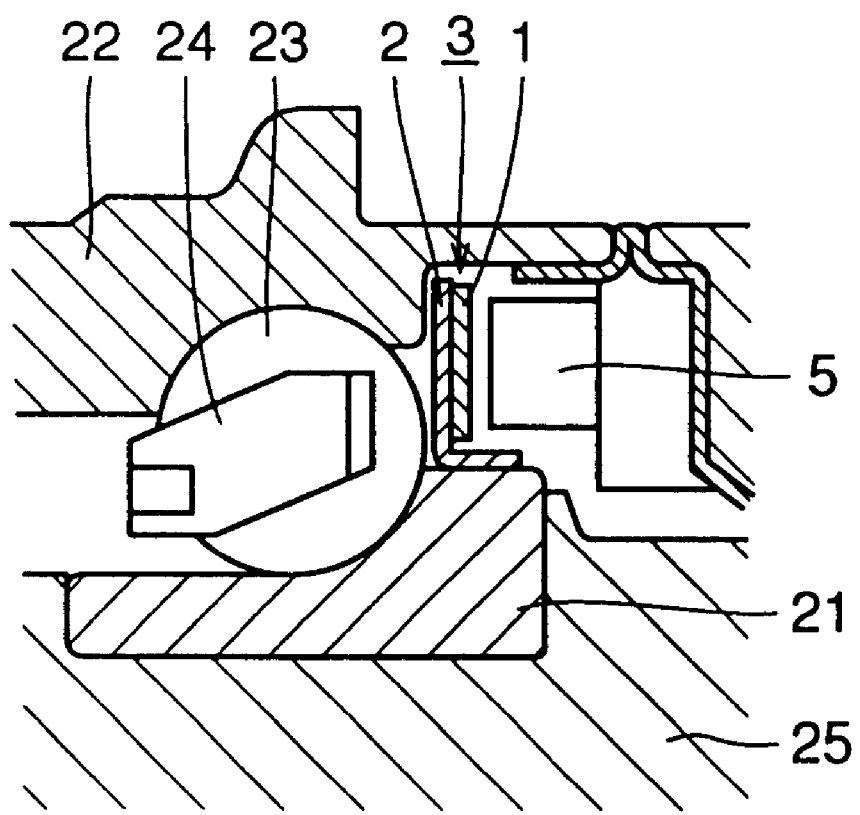
FIG. 16 is a partial sectional view showing an area A5 in FIG. 15 in an enlarged manner.

A wheel bearing shown in FIGS. 15 and 16, rotatably supporting a wheel (coupled driving wheel), mainly has an inner ring 21, an outer ring 22 integrated with a knuckle, a rolling element 23, a holder 24 and the magnetic encoder 3. In particular, the magnetic encoder 3 is press-fitted with an outer diametral portion of an end of the inner ring 21. A magnetic sensor 5 is arranged on a fixed member to be closely opposed to the magnetic member 1 of the magnetic encoder 3. In this wheel bearing, the inner ring 21 is on the side of a rotating member, and the outer ring 22 is on the side of the fixed member.

In each of the aforementioned four types of wheel bearings, the inner ring 21 may be separate from or integrated with the hub ring 25. The outer ring 22 may be separate from or integrated with a knuckle 26.

A sealing slinger used for the wheel bearing is preferably manufactured by press-molding a ferrite-based stainless steel plate of SUS430 or the like since a magnetic substance increases magnetic flux density as a back metal and has preservability.

Although the present invention has been described and illustrated in detail, it is clearly understood that the same is by way of illustration and example only and is not to be taken by way of limitation, the spirit and scope of the present invention being limited only by the terms of the appended claims.

In the magnetic encoder according to the present invention, as hereinabove described, the magnetization pitch error can be reduced below 3% similarly to that obtained in the surface layer magnetization while the surface magnetization strength can be increased to at least 30 mT/mm similarly to that obtained in the one-shot magnetization. Therefore, the magnetic encoder according to the present invention can detect a rotational frequency or the like with higher accuracy.

The wheel bearing according to the present invention, having the aforementioned magnetic encoder, can detect the speed of rotation of a wheel with high accuracy.

In the method of manufacturing a magnetic encoder according to the present invention, the magnetization yoke holds and magnetizes the magnetic member so that the magnetic flux passes through the magnetic member, whereby magnetization strength can be increased to a level similar to that obtained in the one-shot magnetization. Further, each magnetic pole is magnetized and hence surface magnetization strength can be reduced to a level similar to that obtained in the surface layer magnetization so far as indexing accuracy of a spindle is attained.

What is claimed is:

1. A method of manufacturing a magnetic encoder having a magnetic member provided on a circumference of an annular member, said method comprising the steps of:

positioning a section of said magnetic member and said annular member between first and second portions of a magnetization yoke;

magnetizing said section of said magnetic member by passing a magnetic flux in a radial direction relative to said magnetic encoder from said first portion to said second portion so that said magnetic flux passes through said section of said magnetic member between said first and second portions of said magnetization yoke; and rotating said magnetic encoder, wherein
said steps of positioning, magnetizing, and rotating are repeated to form a multipolarity magnetic member with sections, said sections having different polarities and arranged circumferentially about said magnetic encoder.

2. The method of manufacturing a magnetic encoder according to claim 1, making magnetization conditions variable in N pole magnetization and S pole magnetization of the peripheral surface of said magnetic member.

3. The method of manufacturing a magnetic encoder according to claim 2, varying the value of a current fed to a coil wound on said magnetization yoke with said N pole magnetization and said S pole magnetization.

4. The method of manufacturing a magnetic encoder according to claim 2, varying the number of turns of a coil wound on said magnetization yoke with said N pole magnetization and said S pole magnetization.

* * * * *